United States Patent

Roth et al.

[11] Patent Number: 5,172,463
[45] Date of Patent: Dec. 22, 1992

[54] METHOD OF ASSEMBLING A MOTOR DRIVE UNIT FOR A CABLE WINDOW REGULATOR

[75] Inventors: Wolfgang Roth, Asslar-Oberlemp; Thomas Medebach, Wetzlar, both of Fed. Rep. of Germany

[73] Assignee: Kuester & Co. GmbH, Ehringshausen, Fed. Rep. of Germany

[21] Appl. No.: 818,906

[22] Filed: Jan. 10, 1992

Related U.S. Application Data

[62] Division of Ser. No. 486,011, Feb. 23, 1990, Pat. No. 5,109,725.

[30] Foreign Application Priority Data

Feb. 23, 1989 [DE] Fed. Rep. of Germany ....... 3905589

[51] Int. Cl.$^5$ .................. B23P 11/00; G05G 1/08
[52] U.S. Cl. .................................. 29/434; 74/505
[58] Field of Search ............ 74/505, 425, 89.20, 74/606 R, 423, 89.19; 49/352; 29/434, 453, 469, 596, 606

[56] References Cited

U.S. PATENT DOCUMENTS

| | | | |
|---|---|---|---|
| 3,941,437 | 3/1976 | MacInnes et al. | 29/434 |
| 4,216,624 | 8/1980 | Blankenburg et al. | 49/352 |
| 4,478,099 | 10/1984 | Hess et al. | 74/505x |
| 4,503,732 | 3/1985 | Schust | 74/505x |
| 4,652,781 | 3/1987 | Andrei-Alexandru et al. | 74/425 |
| 4,770,056 | 9/1988 | Becker et al. | 74/505 |
| 4,821,589 | 4/1989 | Fukumoto et al. | 74/8922 |
| 4,860,423 | 8/1989 | Baynes | 29/434 |

FOREIGN PATENT DOCUMENTS

| | | | |
|---|---|---|---|
| 0278199 | 8/1988 | European Pat. Off. | 74/425 |
| 2952408 | 7/1981 | Fed. Rep. of Germany | 74/425 |
| 8138613 | 7/1986 | Fed. Rep. of Germany | 74/425 |
| 3519056 | 12/1986 | Fed. Rep. of Germany | 74/505 |

*Primary Examiner*—Vinh T. Luong
*Attorney, Agent, or Firm*—Longacre & White

[57] ABSTRACT

A motor drive unit for a cable window regulator of reduced depth dimension. The drive unit includes two subassemblies which include elements which are combined to form integral assembly pieces. In this manner, the housing of the subassembly can be reduced in dimension and provide a motor drive unit of overall reduced dimension.

1 Claim, 2 Drawing Sheets

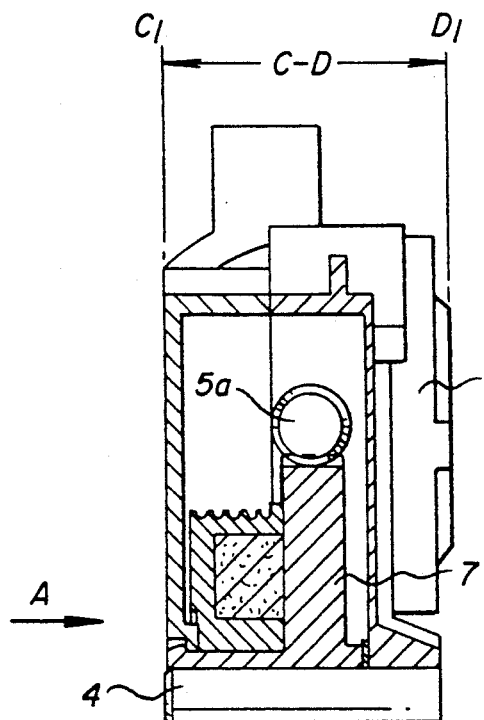
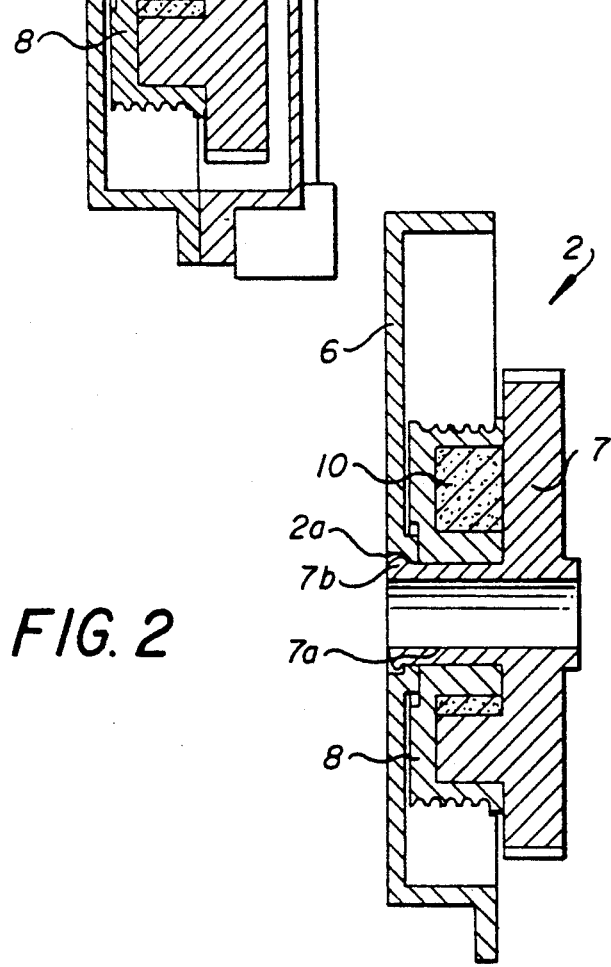
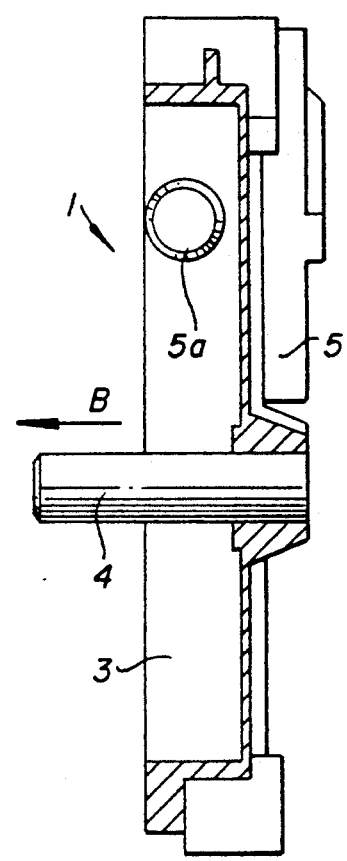
FIG. 1
FIG. 2
FIG. 3

METHOD OF ASSEMBLING A MOTOR DRIVE UNIT FOR A CABLE WINDOW REGULATOR

This is a division of application Ser. No. 07/486,011 filed Feb. 23, 1990 now U.S. Pat. No. 5,109,725 issued on May 5, 1992.

FIELD OF THE INVENTION

The invention relates to the field of motor driven cable window operators. Specifically, the invention relates to the reduction in the depth dimension of the window drive unit. This is particularly advantageous owing to the fact that the drive unit and motor combination usually reside within the confines of an automobile door where space for apparatus is limited.

BACKGROUND OF THE INVENTION

In state of the art motor driven cable type window regulators, an example of which is disclosed in German Patent 35 10 056, the drive unit is inherently bulky owing to the fact that the unit is comprised of several separate subassemblies which are joined to form a drive unit. Within the unit itself, the various worm gears, worm wheels, and cable drums generally comprise separate elements placed within a larger shell. As such, the completed assemblies take on added dimension and bulk in all directions.

While some of these dimensional accumulations are unchangeable by design, ie, owing to the selection of a particular motor type to drive the window, other dimensional accumulations can be enhanced. One example of this dimensional reduction which can be accomplished is the subject of this invention.

A motor drive unit according lo the present invention combines several of the previously separate drive unit elements into integral units. As a result, a motor drive unit according to the present invention has a reduced depth dimension as compared with state of the art motor drive units owing to the reduced bulk comprised by the combined elements when assembled.

Also, owing to the reduced number of separately assembled elements, the motor drive unit according to the present invention achieves economies in assembly time and resources.

SUMMARY OF THE INVENTION

A motor drive unit according to the present invention is generally made by the combination of two subassemblies. The first subassembly casing includes the worm drive gear, mounting provisions for an electric motor, and a bearing pin for the worm wheel.

The second subassembly casing includes a worm wheel, a cable drum which is connected to and driven by the worm wheel, and mounting provisions for the window lift cable sheaths which guide the cables to the cable drum. Within this second subassembly, the worm wheel and cable drum are combined into a single piece owing to the provision of an extended support sheath on the worm wheel which supports the cable drum.

Upon connection of the respective first and second subassemblies, the bearing pin mounted on the first subassembly extends towards and through the center of the worm wheel of the second subassembly so as to support the worm wheel.

The end portion of the projecting sleeve of the worm wheel of the second subassembly may also include a set of projecting hook elements which cooperate with the corresponding openings located in the casing of the second subassembly so as to hold the worm wheel and the housing of the second subassembly together.

Owing to the reduced number of separate assembly pieces required for a motor drive unit according to the present invention, less assembly time is required. In this manner, motor drive units can be manufactured in a more economical manner.

Further, owing to the combination of previously separate parts within the subassemblies, the subassembly can have a reduced depth dimension. The dimensional savings is approximately 4 to 6 mm over a total depth of the motor drive unit of 40+ mm. In this manner, motor drive units according to the present invention can be less than 40 mm deep.

Although such a dimensional reduction is comparatively small, the space in which this reduction is provided, namely the space within the confines of an automobile door, is very limited. Increasingly, this door space is required to accommodate more and more equipment, eg, loudspeakers, automatic door locks, etc.

BRIEF DESCRIPTION OF THE DRAWINGS

FIG. 1 is a sectional elevational view of an assembled motor drive unit according to the present invention;

FIG. 2 is a cross sectional elevational view of a first motor drive unit subassembly according to the present invention;

FIG. 3 is a cross sectional elevational view of a second motor drive unit subassembly according to the present invention; and, FIG. 4 is a plan view of an assembled motor drive unit according to the present invention.

DETAILED DESCRIPTION OF THE PREFERRED EMBODIMENT

Figure 4:
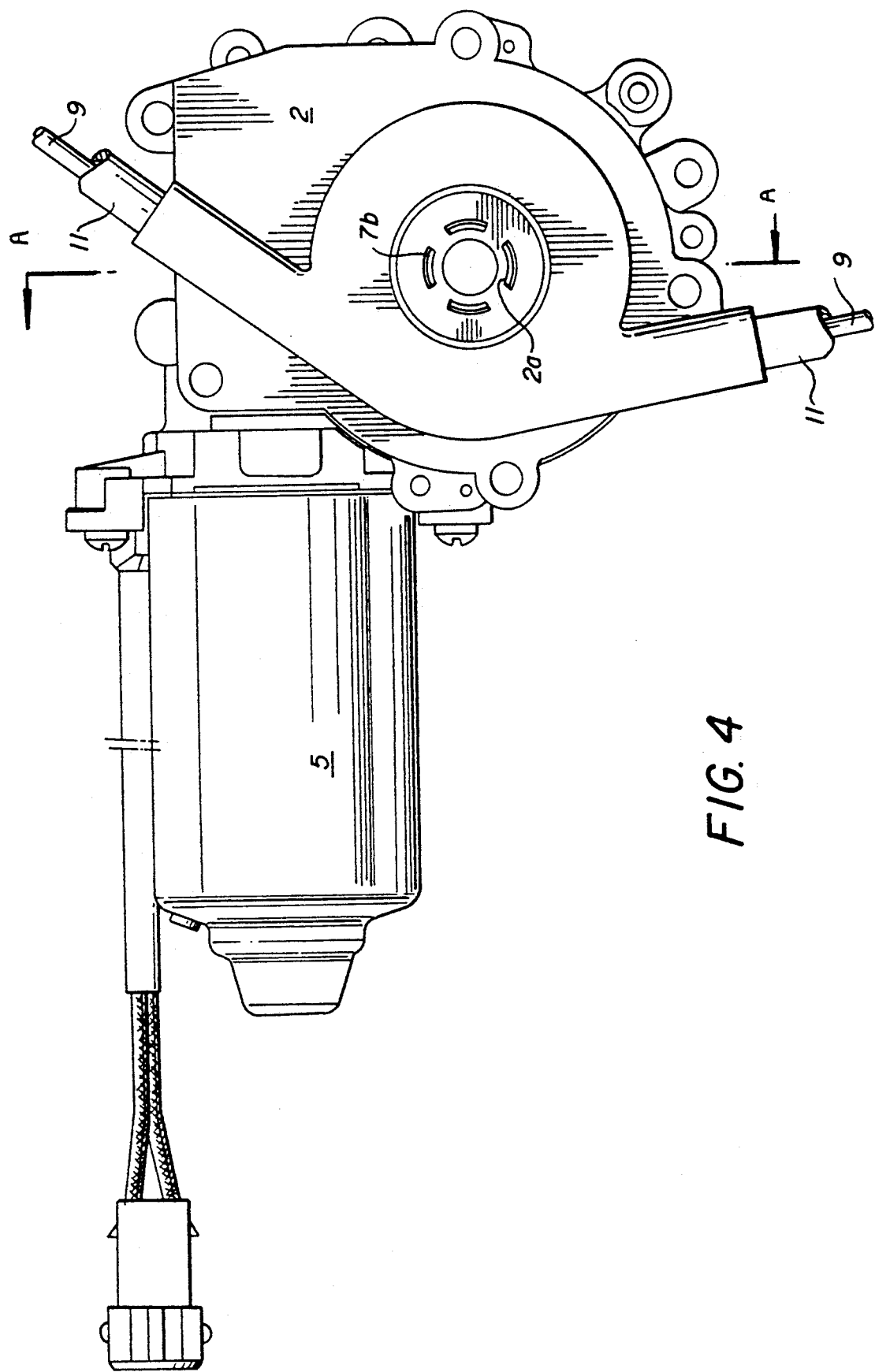

The following description is provided with reference to the drawing figures.

A motor drive unit according to the present invention is comprised of first and second subassemblies, 1 and 2. The first subassembly 1, shown in FIG. 3, includes a housing 3 which accommodates a bearing pin 4 inserted therein. The housing 3 also includes provision for either mounting an electric motor 5 thereon, or having the electric motor housing integral therewith. The first subassembly housing also includes a worm gear 5a which transmits the drive from electric motor 5.

The second subassembly 2, shown in FIG. 2, includes a housing 6 which includes a passage therein for accommodating the bearing pin 4 of the first subassembly. A worm gear 7 is mounted within the second subassembly, and includes a projecting sleeve member 7a. A cable drum 8 is also mounted within the second subassembly, and is mounted directly on the projecting sleeve 7a of the worm wheel 7. The worm wheel drives the mounted cable drum 8 through the combination of conflicting drive tabs on either or both of the worm wheel and cable drum and damping members 10.

The first and second subassemblies are mated together as shown by the arrow marked B on the drawing figures. Bearing pin 4 is inserted into the corresponding hole in the second subassembly to form a rigid connection between the respective assemblies. The subassemblies are also held together by suitable fasteners connected between the plurality of cooperating flanges included on the housings of the respective assemblies.

In the embodiment shown, the worm wheel projecting sleeve 7a is equipped with hook elements 7b. Hook elements 7b are inserted into cooperating openings 2a in the second subassembly housing 2. In this manner the combined worm wheel 7 and cable drum 8 are both held in fixed relation, and are also prevented from being pulled from the second subassembly housing 6.

FIG. 4 shows a plan view of a motor drive unit according to the present invention. From this view of the unit, the mounting sheaths 11 for the window cables 9 are clearly shown. Also shown are the hook elements 7b of the worm wheel 7 extending through openings 2a in the housing 6 of subassembly 2.

As shown in FIG. 1, the depth dimension of a motor drive unit according to the invention is shown as dimension CD. Since the electric drive motor 5 is mounted with the first subassembly (on the right in the figure), this portion of the drive unit for purposes of dimension reduction is limited by the shape of the motor 5, ie, the motor extends a predetermined amount beyond the center axis of the worm drive 5a. Hence, for depth reduction to be accomplished, the dimensional reduction must come from the side of subassembly 2. As such, the present invention drive unit combines the worm wheel and cable drive unit into an integral pair of elements for reduced dimension and assembly ease.

We claim

1. A method of assembling a motor drive unit for a cable window regulator comprising the steps of:

assembling a first subassembly casing comprising a worm drive gear, an electric motor adapted to drive said worm gear, and a bearing pin extending therefrom;

assembling a second subassembly casing comprising a worm wheel, and a cable drum connected to and driven by said worm wheel;

connecting said first subassembly casing to said second subassembly casing by inserting said bearing pin through a center of said worm wheel of said second subassembly, and further comprising the step of positively engaging a portion of said worm wheel extending within an opening in the second subassembly with said worm gear in said second subassembly and retaining said wormwheel and said cable drum against removal from said second subassembly.

* * * * *